(12) United States Patent  (10) Patent No.: US 10,026,280 B2
Qin et al.                  (45) Date of Patent: Jul. 17, 2018

(54) ANTI-LOST NOTIFICATION METHOD AND ANTI-THEFT DEVICE

(71) Applicant: Huawei Technologies Co., Ltd., Shenzhen (CN)

(72) Inventors: Muyun Qin, Shanghai (CN); Ruimin Wang, Shenzhen (CN); Rongan Peng, Shanghai (CN); Jianhua Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/515,065

(22) PCT Filed: Sep. 29, 2014

(86) PCT No.: PCT/CN2014/087819
§ 371 (c)(1),
(2) Date: Mar. 28, 2017

(87) PCT Pub. No.: WO2016/049820
PCT Pub. Date: Apr. 7, 2016

(65) Prior Publication Data
US 2017/0213433 A1 Jul. 27, 2017

(51) Int. Cl.
*G08B 1/08* (2006.01)
*G08B 13/14* (2006.01)
(Continued)

(52) U.S. Cl.
CPC ....... *G08B 13/1436* (2013.01); *G01C 22/006* (2013.01); *G08B 29/188* (2013.01);
(Continued)

(58) Field of Classification Search
CPC ............. G08B 13/1436; G08B 29/188; H04B 17/309; H04W 76/06
(Continued)

(56) References Cited

U.S. PATENT DOCUMENTS 6,185,198 B1 * 2/2001 LaDue ............... H04B 7/18567
                                                    370/329
6,490,443 B1 * 12/2002 Freeny, Jr. ............. G06Q 20/32
                                                    455/406
(Continued)

FOREIGN PATENT DOCUMENTS

CN      201750762 U    2/2011
CN      102509409 A    6/2012
(Continued)

OTHER PUBLICATIONS

Machine Translation and Abstract of Chinese Publication No. CN102509409, Jun. 20, 2012, 13 pages.
(Continued)

*Primary Examiner* — John A Tweel, Jr.
(74) *Attorney, Agent, or Firm* — Conley Rose, P.C.

(57) ABSTRACT

An anti-lost notification method and an anti-theft device, which can improve accuracy of BLUETOOTH anti-lost notification, and avoid erroneous vibration notification in a non-lost case, where the method includes determining whether a step count value in first preset duration before a connection between an anti-theft device and a peer device is disconnected is greater than a preset value; if the step count value is greater than the preset value, determining whether a signal quality value sequence of a communication signal between the anti-theft device and the peer device shows a progressively decreasing trend in the first preset duration before the connected is disconnected; and giving an alarm if the signal quality value sequence shows a progressively decreasing trend in the first preset duration before the connected is disconnected.

11 Claims, 4 Drawing Sheets

(51) Int. Cl.
*H04W 76/06* (2009.01)
*H04B 17/309* (2015.01)
*G08B 29/18* (2006.01)
*G01C 22/00* (2006.01)
*H04W 76/30* (2018.01)

(52) U.S. Cl.
CPC .......... *H04B 17/309* (2015.01); *H04W 76/06* (2013.01); *H04W 76/30* (2018.02)

(58) Field of Classification Search
USPC .................................................... 340/539.13
See application file for complete search history.

(56) References Cited

U.S. PATENT DOCUMENTS

| | | | |
|---|---|---|---|
| 6,816,081 B1* | 11/2004 | Okada | G07C 9/00182 340/12.5 |
| 2008/0197987 A1 | 8/2008 | King et al. | |
| 2013/0234853 A1 | 9/2013 | Kazerouni | |
| 2014/0073262 A1 | 3/2014 | Gutierrez et al. | |

FOREIGN PATENT DOCUMENTS

| | | |
|---|---|---|
| CN | 103426268 A | 12/2013 |
| JP | 2013257835 A | 12/2013 |
| WO | 9966470 A1 | 12/1999 |

OTHER PUBLICATIONS

Machine Translation and Abstract of Chinese Publication No. CN103426268, Dec. 4, 2013, 8 pages.
Machine Translation and Abstract of Chinese Publication No. CN201750762, Feb. 23, 2011, 6 pages.
Machine Translation and Abstract of Japanese Publication No. JP2013257835, Part 1, Dec. 26, 2013, 11 pages.
Machine Translation and Abstract of Japanese Publication No. JP2013257835, Part 2, Dec. 26, 2013, 3 pages.
Foreign Communication From a Counterpart Application, European Application No. 14903422.5, Extended European Search Report dated Jul. 31, 2017, 10 pages.
Foreign Communication From a Counterpart Application, PCT Application No. PCT/CN2014/087819, English Translation of International Search Report dated May 29, 2015, 2 pages.
Foreign Communication From a Counterpart Application, PCT Application No. PCT/CN2014/087819, English Translation of Written Opinion dated May 29, 2015, 8 pages.

* cited by examiner

ANTI-LOST NOTIFICATION METHOD AND ANTI-THEFT DEVICE

CROSS-REFERENCE TO RELATED APPLICATION

This application is a national stage of International Patent Application No. PCT/CN2014/087819, filed on Sep. 29, 2014, which is hereby incorporated by reference in its entirety.

TECHNICAL FIELD

The present disclosure relates to the communications field, and in particular, to an anti-lost notification method and an anti-theft device.

BACKGROUND

With the rise of a wearable boom, various wearable device products emerge on the market. These types of wearable device products always keep in contact with a human body, and most of the wearable device products support various types of notification functions, for example, a wristband used for mobile phone anti-lost notification. After being powered on, the wristband connects to a mobile phone using BLUETOOTH, and establishes a stable BLUETOOTH connection. When a distance between the wristband and the mobile phone exceeds a particular distance, the BLUETOOTH connection between the wristband and the mobile phone is disconnected, and then the wristband vibrates to notify a user that the mobile phone may be lost.

However, the wristband may give erroneous vibration notification in a case in which the BLUETOOTH connection is disconnected even when the distance between the mobile phone and the wristband does not exceed a preset distance (for example, an obstruction between the wristband and the mobile phone causes deterioration of a channel environment).

SUMMARY

Embodiments of the present disclosure provide an anti-lost notification method and an anti-theft device, which can improve accuracy of BLUETOOTH anti-lost notification, and avoid erroneous vibration notification in a non-lost case.

To achieve the foregoing objective, the technical solutions used in the embodiments of the present disclosure are as follows.

According to a first aspect, an anti-lost notification method is disclosed and is applied to an anti-theft device, where the method includes determining whether a step count value in first preset duration before a connection between the anti-theft device and a peer device is disconnected is greater than a preset value; if the step count value is greater than the preset value, determining whether a signal quality value sequence of a communication signal between the anti-theft device and the peer device shows a progressively decreasing trend in the first preset duration before the connection is disconnected; and giving an alarm if the signal quality value sequence shows a progressively decreasing trend in the first preset duration before the connection is disconnected.

With reference to the first aspect, in a first possible implementation method of the first aspect, the method further includes giving an alarm if the signal quality value sequence does not show a progressively decreasing trend in the first preset duration before the connection is disconnected, and the connection is not restored after being disconnected for second preset duration.

With reference to the first aspect, in a second possible implementation method of the first aspect, the method further includes skipping starting an alarm if the signal quality value sequence does not show a progressively decreasing trend in the first preset duration before the connection is disconnected, and the connection is restored after being disconnected for second preset duration.

With reference to the first aspect, in a third possible implementation method of the first aspect, the method further includes giving an alarm if it is determined that the step count value is less than the preset value, and the connection is not restored after being disconnected for second preset duration.

With reference to the first aspect, in a fourth possible implementation method of the first aspect, the method further includes skipping starting an alarm if it is determined that the step count value is less than the preset value, and the connection is restored after being disconnected for second preset duration.

With reference to the first aspect, in a fifth possible implementation method of the first aspect, before the determining whether a step count value in first preset duration before a connection between the anti-theft device and a peer device is disconnected is greater than a preset value, the method further includes counting, by the anti-theft device in real time, a quantity of steps that is in the first preset duration prior to each moment, so as to obtain the step count value that is in the first preset duration before the connection is disconnected.

According to a second aspect, an anti-theft device is disclosed, including a determining unit configured to determine whether a step count value in first preset duration before a connection between the anti-theft device and a peer device is disconnected is greater than a preset value; where the determining unit is further configured to, if the step count value is greater than the preset value, determine whether a signal quality value sequence of a communication signal between the anti-theft device and the peer device shows a progressively decreasing trend in the first preset duration before the connection is disconnected; and an alarm unit configured to give an alarm when the signal quality value sequence shows a progressively decreasing trend in the first preset duration before the connection is disconnected.

With reference to the second aspect, in a first possible anti-theft device of the second aspect, the alarm unit is further configured to give an alarm when the signal quality value sequence does not show a progressively decreasing trend in the first preset duration before the connection is disconnected, and the connection is not restored after being disconnected for second preset duration.

With reference to the second aspect, in a second possible anti-theft device of the second aspect, the alarm unit is further configured to give an alarm when it is determined that the step count value is less than the preset value, and the connection is not restored after being disconnected for second preset duration.

With reference to the second aspect, in a third possible anti-theft device of the second aspect, the alarm unit is further configured to skip starting an alarm when it is determined that the step count value is less than the preset value, and the connection is restored after being disconnected for second preset duration.

With reference to the second aspect, in a fourth possible anti-theft device of the second aspect, the alarm unit is further configured to skip starting an alarm when the step count value is less than the preset value, and the signal connection is restored after second preset duration.

With reference to the second aspect, in a fifth possible anti-theft device of the second aspect, the anti-theft device further includes a counting unit, where the counting unit is configured to, before the determining unit determines whether the step count value in the first preset duration before the connection between the anti-theft device and the peer device is disconnected is greater than the preset value, count in real time a quantity of steps that is in the first preset duration prior to each moment, so as to obtain the step count value that is in the first preset duration before the connection is disconnected.

According to a third aspect, an anti-theft device is disclosed, including a processor configured to determine whether a step count value in first preset duration before a connection between the anti-theft device and a peer device is disconnected is greater than a preset value; and if the step count value is greater than the preset value, determine whether a signal quality value sequence of a communication signal between the anti-theft device and the peer device shows a progressively decreasing trend in the first preset duration before the connection is disconnected; and trigger an alarm to give an alarm when the signal quality value sequence shows a progressively decreasing trend in the first preset duration before the connection is disconnected.

With reference to the third aspect, in a first possible anti-theft device of the third aspect, the processor is further configured to trigger the alarm to give an alarm when the signal quality value sequence does not show a progressively decreasing trend in the first preset duration before the connection is disconnected, and the connection is not restored after being disconnected for second preset duration.

With reference to the third aspect, in a second possible anti-theft device of the third aspect, the processor is further configured to trigger the alarm to give an alarm when determining that the step count value is less than the preset value, and that the connection is not restored after being disconnected for second preset duration.

With reference to the third aspect, in a third possible anti-theft device of the third aspect, the processor is further configured to skip starting an alarm when determining that the step count value is less than the preset value, and that the connection is restored after being disconnected for second preset duration. With reference to the third aspect, in a fourth possible anti-theft device of the third aspect, the processor is further configured to skip starting an alarm when the step count value is less than the preset value, and the signal connection is restored after second preset duration.

With reference to the third aspect, in a fifth possible anti-theft device of the third aspect, the anti-theft device further includes an acceleration sensor, where the acceleration sensor is configured to connect to the processor, and sense a user motion to report sensed data to the processor, where before determining, according to the data reported by the acceleration sensor, whether the step count value in the first preset duration before the connection between the anti-theft device and the peer device is disconnected is greater than the preset value, the processor counts in real time a quantity of steps that is in the first preset duration prior to each moment.

According to the anti-lost notification method and the anti-theft device provided in the embodiments of the present disclosure, when a connection of an anti-theft device is disconnected, the anti-theft device immediately determines a step count value that is in first preset duration prior to a moment at which the connection is disconnected. If it is determined that the step count value is greater than a preset value, it is determined whether a signal strength value of a communication signal between the anti-theft device and the peer device shows a progressively decreasing trend in the first preset duration before the connection is disconnected. An alarm is immediately given if the signal strength value of the communication signal between the anti-theft device and the peer device shows a progressively decreasing trend in the first preset duration before the connection is disconnected. An alarm is immediately given if it is determined that the step count value is greater than the preset value, the signal strength value does not show a progressively decreasing trend in the first preset duration before the connection is disconnected, and the connection is not restored after being disconnected for second preset duration. In the prior art, the anti-theft device immediately gives an alarm after a signal connection is disconnected. Actually, there may be a case in which the signal connection is disconnected even when a distance between the peer device and the anti-theft device does not exceed a preset distance (for example, an obstruction between the anti-theft device and the peer device causes deterioration of a channel environment). Therefore, the anti-theft device gives erroneous vibration notification. The anti-lost notification method provided in the embodiments of the present disclosure can improve accuracy of BLUETOOTH anti-lost notification, and avoid erroneous vibration notification in a non-lost case.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall in the protection scope of the present disclosure.

Embodiment 1

Figure 1:
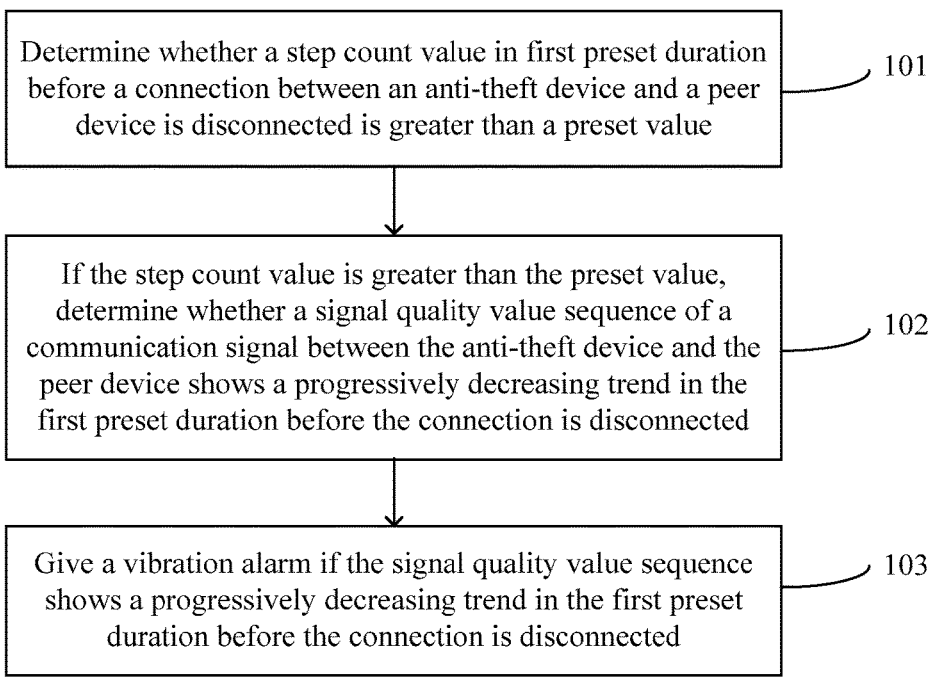
FIG. 1 is a schematic flowchart of an anti-lost notification method according to Embodiment 1 of the present disclosure.

This embodiment of the present disclosure provides an anti-lost notification method, which is applied to an anti-theft device. As shown in FIG. 1, the method includes the following steps.

101. Determine whether a step count value in first preset duration before a connection between the anti-theft device and a peer device is disconnected is greater than a preset value.

The first preset duration is a time interval prior to a moment at which the connection is disconnected. The anti-theft device may be a wearable anti-theft device, for example, a BLUETOOTH anti-theft wristband. The peer device may be a mobile phone. The anti-theft device and the peer device may be connected using BLUETOOTH, or may be connected using another signal.

It should be noted that, the first preset duration before the connection is disconnected herein refers to a time period that is equal to the first preset duration starting backwards from the moment at which the connection is disconnected. For example, if the first preset duration is 3 seconds, and the connection is disconnected at the 21st second, it is determined whether a step count value in a time period from the 18th second to the 21st second is greater than the preset value.

The anti-theft device counts in real time a quantity of steps that is in the first preset duration prior to each moment, so as to obtain the step count value that is in the first preset duration before the connection is disconnected. That is, for any moment, a quantity of steps in the first preset duration prior to the moment is counted.

If the first preset duration is 3 seconds, the anti-theft device counts in real time a quantity of steps that is in the 3 seconds prior to each moment. Therefore, if a signal connection is disconnected at the 21st second, the anti-theft device obtains a step count value that is from the 18th second to the 21st second. If the signal connection is disconnected at the 30th second, the anti-theft device obtains a step count value that is from the 27th second to the 30th second.

Before step 101, the anti-theft device further needs to obtain the step count value that is in the first preset duration prior to the moment at which the connection is disconnected. The anti-theft device can detect a user motion using an internal acceleration sensor, so as to count in real time a quantity of steps that is in the first preset duration prior to each moment, and obtain the quantity of steps that is in the first preset duration prior to the moment at which the connection is disconnected.

It should be noted that, the first preset duration may be set by a user of the anti-theft device, which is not limited herein. Generally, the signal connection may be disconnected because the peer device is away from the anti-theft device, or because channel quality deteriorates with the user's arm swinging. Therefore, vibration notification immediately given after the signal connection is disconnected may be erroneous notification. However, by further comparing the preset value with a step count value that is in a period of time before the signal connection is disconnected, it may be more accurately determined whether the signal connection is disconnected because the peer device is away from the anti-theft device.

102. If the step count value is greater than the preset value, determine whether a signal quality value sequence of a communication signal between the anti-theft device and the peer device shows a progressively decreasing trend in the first preset duration before the connection is disconnected.

Herein, the signal quality value is obtained after anti-pulse interference average filtering processing is performed on a received signal strength indicator (RSSI) value of the signal. Theoretically, the RSSI value of the signal exponentially decreases with a progressive increase in distance. Because of interference with the signal from a random factor in a wireless channel, an obtained RSSI value may be inaccurate. Therefore, anti-pulse interference average filtering processing needs to be performed on the RSSI value of the signal. After an accurate RSSI value is obtained, subsequent determining is performed. It should be noted that, the accurate RSSI value herein is the signal quality value sequence in this embodiment of the present disclosure. Certainly, if channel quality is fairly good, and interference with the signal may be ignored, an obtained RSSI value of the signal may be directly used as the signal quality value in the present disclosure.

The anti-theft device collects in real time statistics about a variation trend that is of the signal quality value sequence in the first preset duration prior to each moment. For example, if the first preset duration is 3 seconds, and the connection is disconnected at the 21st second, statistics about a signal quality value sequence in a time period from the 18th second to the 21st second are collected. If the signal quality value sequence is obtained every 0.5 second, a signal quality value sequence that includes six signal quality values is obtained from the 18th second to the 21st second, and variation trends of six signal quality value sequences need to be determined.

103. Give an alarm if the signal quality value sequence shows a progressively decreasing trend in the first preset duration before the connection is disconnected.

The alarm may be in a manner of buzzing of the anti-theft device or blinking of a light emitting diode (LED) light.

After the signal connection is disconnected, if the step count value is greater than the preset value, it indicates that the peer device may be away from the anti-theft device. It can be confirmed that the peer device is away from the anti-theft device only when it is determined that the signal quality value sequence decreases progressively in the first preset duration before the signal connection is disconnected. If the signal quality value sequence does not decrease progressively in the first preset duration before the signal connection is disconnected, it indicates that the peer device is not away from the anti-theft device.

Therefore, if the signal quality value sequence shows a progressively decreasing trend in the first preset duration before the signal connection is disconnected, and the peer device is away from the anti-theft device, it indicates a large possibility that the peer device is stolen or lost, and an alarm is immediately given to notify the user that the peer device may be lost.

In addition, if the signal quality value sequence of the signal does not decrease progressively in the first preset duration before the connection is disconnected, it indicates that the peer device is not away from the anti-theft device. Generally, when the peer device is not away from the anti-theft device, and the connection is automatically restored after being disconnected for second preset duration, no alarm needs to be given.

If the signal quality value sequence of the signal does not decrease progressively in the first preset duration before the connection is disconnected, and the connection is not restored after being disconnected for the second preset duration, an alarm still needs to be given to notify the user that the peer device may be lost. If the connection is restored after being disconnected for the second preset duration, it indicates that the signal connection may be disconnected due to the user's arm swinging. In this case, the signal connection may be automatically restored in a period of time; therefore, no alarm needs to be given to notify the user.

In addition, an alarm is given if the anti-theft device determines that the step count value is less than the preset value, and the connection is not restored after being disconnected for the second preset duration. No alarm is started if the anti-theft device determines that the step count value is less than the preset value, and the connection is restored after being disconnected for the second preset duration.

Preferably, in a preferred embodiment of the present disclosure, before the determining whether a step count value in first preset duration before a connection between the anti-theft device and a peer device is disconnected is greater than a preset value, the method further includes counting, by the anti-theft device in real time, a quantity of steps that is in the first preset duration prior to each moment, so as to obtain the step count value that is in the first preset duration before the connection is disconnected. That is, for any moment, a quantity of steps in the first preset duration prior to the moment is counted.

If the first preset duration is 3 seconds, the anti-theft device counts in real time a quantity of steps that is in the 3 seconds prior to each moment. Therefore, if the signal connection is disconnected at the 21st second, the anti-theft device obtains a step count value that is from the 18th second to the 21st second. If the signal connection is disconnected at the 30th second, the anti-theft device obtains a step count value that is from the 27th second to the 30th second. It should be noted that, the preset value is a quantity of steps corresponding to a security distance between the anti-theft device and the peer device, and the second preset duration is duration in which the signal connection is restored in the security distance between the anti-theft device and the peer device. The first preset duration, the second preset duration, and the preset value all may be set by the user of the anti-theft device, or be set by a manufacturer before delivery, which is not limited herein.

Certainly, after detecting that the signal connection between the anti-theft device and the peer device is disconnected, the anti-theft device may directly give an alarm, which is also a solution in the prior art. In this embodiment of the present disclosure, two modes are set for the anti-theft device. One mode is immediately giving a vibration alarm once it is detected that a BLUETOOTH connection is disconnected. The other mode is performing steps 101 to 103 in this embodiment. The two modes may be selected and set by the user of the anti-theft device, which is not limited herein.

According to the anti-lost notification method provided in this embodiment of the present disclosure, when a connection of an anti-theft device is disconnected, the anti-theft device immediately determines a step count value that is in first preset duration prior to a moment at which the connection is disconnected. If it is determined that the step count value is greater than a preset value, it is determined whether a signal strength value sequence of a communication signal between the anti-theft device and the peer device shows a progressively decreasing trend in the first preset duration. An alarm is immediately given if the signal strength value sequence of the communication signal between the anti-theft device and the peer device shows a progressively decreasing trend in the first preset duration. An alarm is immediately given if it is determined that the step count value is greater than the preset value, the signal strength value sequence does not show a progressively decreasing trend in the first preset duration, and the connection is not restored after being disconnected for second preset duration. In the prior art, the anti-theft device immediately gives an alarm after a signal connection is disconnected. Actually, there may be a case in which the signal connection is disconnected even when a distance between the peer device and the anti-theft device does not exceed a preset distance (for example, an obstruction between the anti-theft device and the peer device causes deterioration of a channel environment). Therefore, the anti-theft device gives erroneous vibration notification. The anti-lost notification method provided in this embodiment of the present disclosure can improve accuracy of BLUETOOTH anti-lost notification, and avoid erroneous vibration notification in a non-lost case.

Embodiment 2

Figure 2:
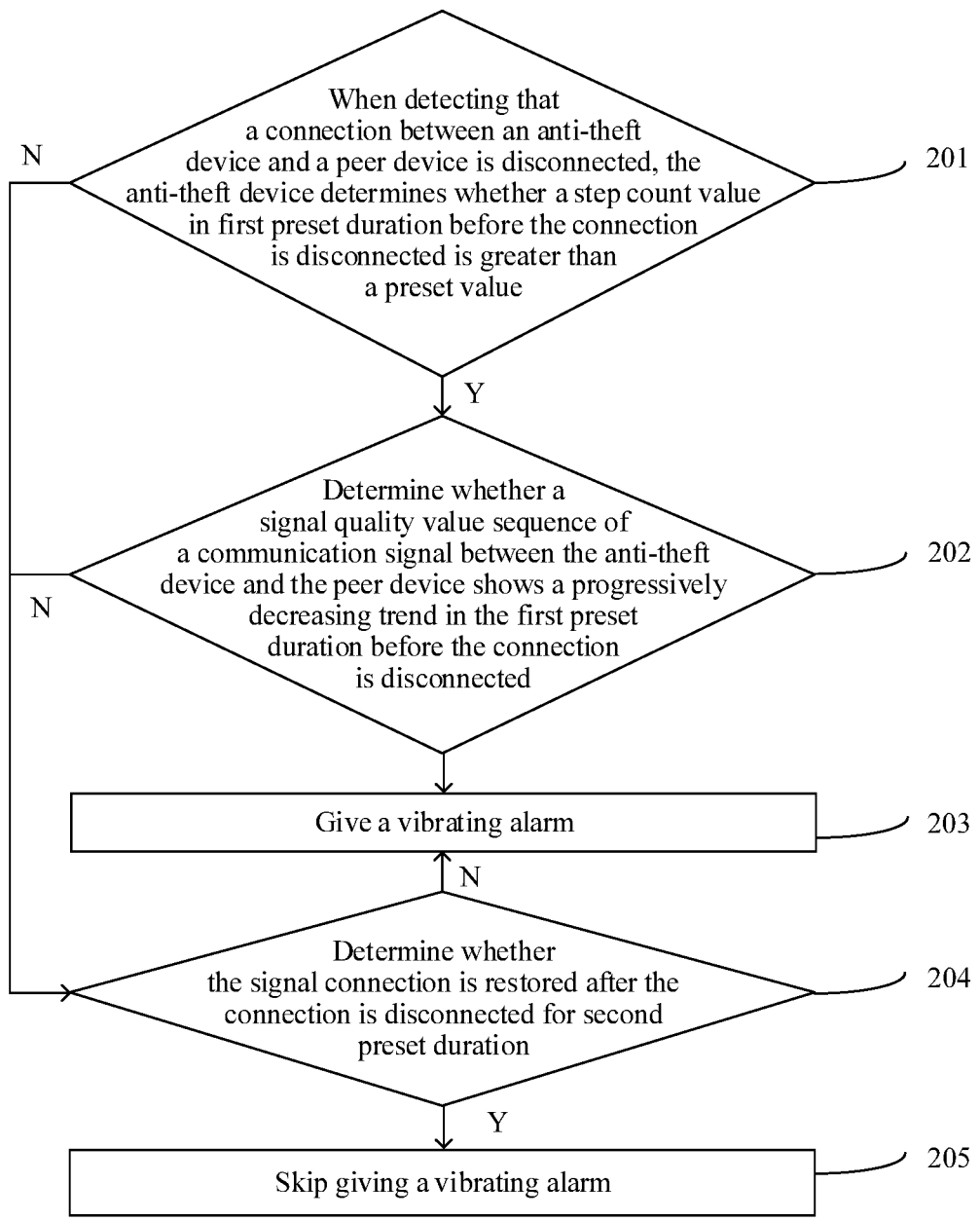
FIG. 2 is a schematic flowchart of an anti-lost notification method according to Embodiment 2 of the present disclosure.

This embodiment of the present disclosure provides an anti-lost notification method. As shown in FIG. 2, the method includes the following steps.

201. When detecting that a connection between an anti-theft device and a peer device is disconnected, the anti-theft device determines whether a step count value in first preset duration before the connection is disconnected is greater than a preset value.

The first preset duration is a time interval prior to a moment at which the connection is disconnected. The preset value is set by a user of the anti-theft device, or is set by a manufacturer at delivery, which is not limited herein.

Generally, the signal connection may be disconnected because the peer device is away from the anti-theft device, or because channel quality deteriorates with the user's arm swinging. Therefore, vibration notification immediately given after the signal connection is disconnected may be erroneous notification. Therefore, further determining is needed to improve accuracy of vibration notification. By further comparing the preset value with a step count value that is in a period of time before the signal connection is disconnected, it may be more accurately determined whether the signal connection is disconnected because the peer device is away from the anti-theft device. If the step count value is greater than the preset value, it indicates that the peer device may be away from the anti-theft device; if the step count value is not greater than the preset value, it indicates that the peer device is not away from the anti-theft device, and the signal connection is disconnected due to the user's arm swinging.

If the step count value in the first preset duration before the connection is disconnected is greater than the preset value, step 202 is performed; if the step count value in the first preset duration before the connection is disconnected is not greater than the preset value, step 204 is performed.

202. Determine whether a signal quality value sequence of a communication signal between the anti-theft device and the peer device shows a progressively decreasing trend in the first preset duration before the connection is disconnected.

If the signal quality value sequence shows a progressively decreasing trend in the first preset duration before the connection is disconnected, step 203 is performed; if the signal quality value sequence does not show a progressively decreasing trend in the first preset duration before the connection is disconnected, step 204 is performed.

203. Give an alarm.

If the signal quality value sequence decreases progressively in the first preset duration before the connection is disconnected, it indicates that a distance between the peer device and the anti-theft device increases progressively in the first preset duration before the connection is disconnected, and because the anti-theft device in this embodiment of the present disclosure is generally a wearable device, it indicates that the peer device has been away from the user, and there is a large possibility that the peer device may have been lost. Therefore, an alarm should be immediately given to notify the user.

204. Determine whether the connection is restored after being disconnected for second preset duration.

Herein, a premise is that the step count value is not greater than the preset value, or the signal quality value sequence does not show a progressively decreasing trend in the first preset duration before the connection is disconnected. The two cases both indicate that the peer device is not away from the anti-theft device. Generally, when the peer device is not away from the anti-theft device, because the signal connection is disconnected due to the user's arm swinging, the signal connection is restored in an extremely short time. Therefore, whether the signal connection is restored needs to be detected after the connection is disconnected for the second preset duration.

If the connection is restored, no alarm is needed; if the connection is not restored, a vibration alarm is needed. That is, when the connection is restored, step 205 is performed; when the signal connection is not restored, step 203 is performed.

205. Skip starting a vibration alarm.

In this case, the signal connection returns to normal.

According to the anti-lost notification method provided in this embodiment of the present disclosure, when a connection of an anti-theft device is disconnected, the anti-theft device immediately determines a step count value that is in first preset duration prior to a moment at which the connection is disconnected. If it is determined that the step count value is greater than a preset value, it is determined whether a signal strength value of a communication signal between the anti-theft device and the peer device shows a progressively decreasing trend in the first preset duration before the connection is disconnected. An alarm is immediately given if the signal strength value of the communication signal between the anti-theft device and the peer device shows a progressively decreasing trend in the first preset duration before the connection is disconnected. An alarm is immediately given if it is determined that the step count value is greater than the preset value, the signal strength value does not show a progressively decreasing trend in the first preset duration before the connection is disconnected, and the connection is not restored after being disconnected for second preset duration. In the prior art, the anti-theft device immediately gives an alarm after a signal connection is disconnected. Actually, there may be a case in which the signal connection is disconnected even when a distance between the peer device and the anti-theft device does not exceed a preset distance (for example, an obstruction between the anti-theft device and the peer device causes deterioration of a channel environment). Therefore, the anti-theft device gives erroneous vibration notification. The anti-lost notification method provided in this embodiment of the present disclosure can improve accuracy of BLUETOOTH anti-lost notification, and avoid erroneous vibration notification in a non-lost case.

Embodiment 3

Figure 3:
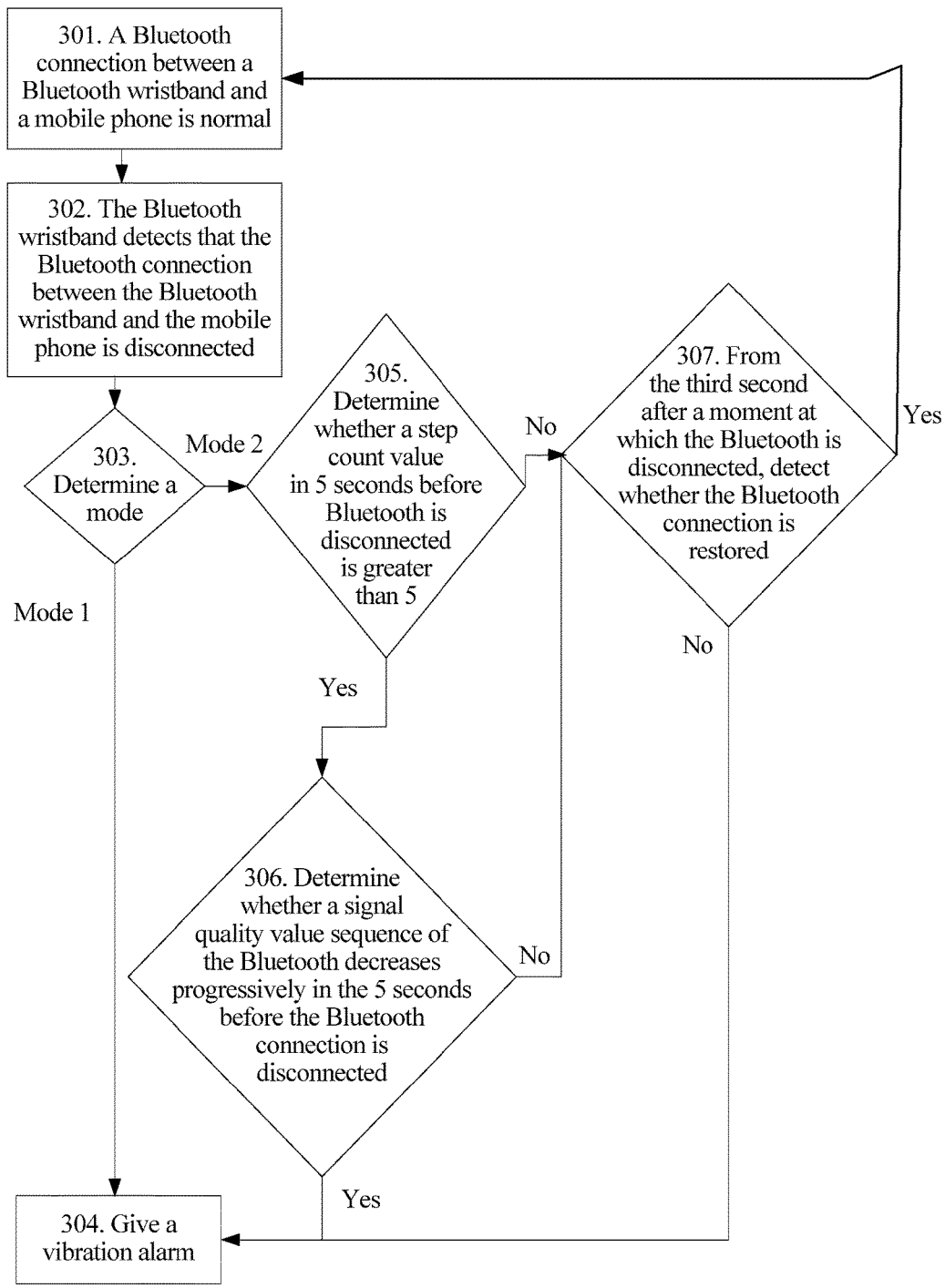
FIG. 3 is a schematic flowchart of an anti-lost notification method according to Embodiment 3 of the present disclosure.

This embodiment of the present disclosure provides an anti-lost notification method. A connection between an anti-theft device and a peer device is established using BLUETOOTH. First preset duration is equal to 5 seconds, second preset duration is equal to 2 seconds, and a preset value is equal to 5. The anti-theft device is a BLUETOOTH wristband, and the peer device is a mobile phone. As shown in FIG. 3, the method includes the following steps.

301. A BLUETOOTH connection between the BLUETOOTH wristband and the mobile phone is normal.

302. The BLUETOOTH wristband detects that the BLUETOOTH connection between the BLUETOOTH wristband and the mobile phone is disconnected.

303. Determine a mode.

It should be noted that, in the method provided in this embodiment of the present disclosure, the BLUETOOTH wristband has two modes, where a mode 1 is immediately giving an alarm once the BLUETOOTH is disconnected; a mode 2 is performing multiple-stage determining to improve accuracy of giving an alarm.

If a mode set by a user is the mode 1, step 304 is performed; if the mode set by the user is the mode 2, step 305 is performed.

304. Give an alarm.

305. Determine whether a step count value in 5 seconds before the BLUETOOTH connection is disconnected is greater than 5.

The "5 seconds" before the BLUETOOTH connection is disconnected herein refers to a time period that is equal to the 5 seconds starting backwards from a moment at which the BLUETOOTH connection is disconnected. For example, if the BLUETOOTH connection is disconnected at the 21st second, it is determined whether a step count value in a time period from the 16th second to the 21st second is greater than 5.

If the step count value in the 5 seconds before the BLUETOOTH connection is disconnected is greater than 5, step 306 is performed; if the step count value in the 5 seconds before the BLUETOOTH connection is disconnected is not greater than 5, step 307 is performed.

306. Determine whether a signal quality value sequence of a BLUETOOTH signal decreases progressively in the 5 seconds before the BLUETOOTH connection is disconnected.

If the signal quality value sequence of the BLUETOOTH signal decreases progressively in the 5 seconds before the BLUETOOTH connection is disconnected, step 304 is performed; if the signal quality value sequence of the BLUETOOTH signal does not decrease progressively in the 5 seconds before the BLUETOOTH connection is disconnected, step 307 is performed.

307. From the third second after a moment at which the BLUETOOTH is disconnected, detect whether the BLUETOOTH connection is restored.

If the BLUETOOTH connection is restored, step 301 is performed; if the BLUETOOTH connection is not restored, step 304 is performed.

According to the anti-lost notification method provided in this embodiment of the present disclosure, by means of a user's selected configuration, a wristband may work in a traditional mode 1, or may work in a mode 2. A double determining mechanism is used. Firstly, first-stage determining is performed on a step count value, where the determining can cover most erroneous loss-determining scenarios; and second-stage determining is performed only after it is determined, in the first-stage determining, that a quantity of steps is greater than a particular value, where if a signal quality value sequence does not comply with a decreasing law, it is considered to be an erroneous loss-determining scenario, and no alarm is started. In addition, after a particular time delay after it is determined that a mobile phone is not away from the wristband, it is determined whether a BLUETOOTH connection is restored, and an alarm is started only after it is determined that the BLUETOOTH connection is not restored, so as to avoid frequent occurrence of a phenomenon in which the wristband erroneously vibrates. A technical solution used to enhance precision of BLUETOOTH anti-lost determining can effectively improve precision of wristband BLUETOOTH anti-lost determining, avoid an erroneous vibration alarm, caused by a factor such as arm swinging, in a non-lost case, and improve product user experience.

Embodiment 4

Figure 4:
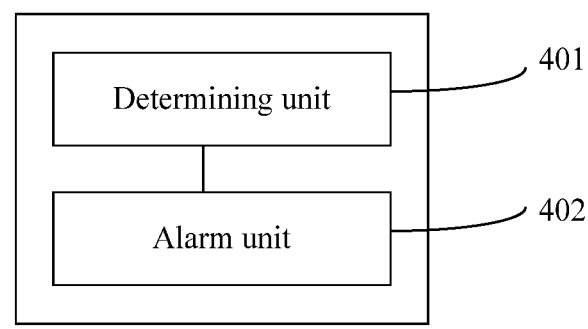
FIG. 4 is a structural block diagram of an anti-theft device according to Embodiment 4 of the present disclosure.

This embodiment of the present disclosure provides an anti-theft device. As shown in FIG. 4, the anti-theft device includes a determining unit 401 and an alarm unit 402.

The determining unit 401 is configured to determine whether a step count value in first preset duration before a connection between the anti-theft device and a peer device is disconnected is greater than a preset value.

The determining unit 401 is further configured to, if the step count value is greater than the preset value, determine whether a signal quality value sequence of a communication signal between the anti-theft device and the peer device shows a progressively decreasing trend in the first preset duration before the connection is disconnected.

The alarm unit 402 is configured to give an alarm when the signal quality value sequence shows a progressively decreasing trend in the first preset duration before the connection is disconnected.

The alarm unit 402 is further configured to give an alarm when the signal quality value sequence does not show a progressively decreasing trend in the first preset duration before the connection is disconnected, and the connection is not restored after being disconnected for second preset duration.

The alarm unit 402 is further configured to give an alarm when it is determined that the step count value is less than the preset value, and the connection is not restored after being disconnected for the second preset duration.

The alarm unit 402 is further configured to skip starting an alarm when it is determined that the step count value is less than the preset value, and the connection is restored after being disconnected for the second preset duration.

The alarm unit 402 is further configured to skip starting an alarm when the step count value is less than the preset value, and the signal connection is restored after the second preset duration.

The anti-theft device further includes a counting unit.

The counting unit is configured to, before the determining unit 401 determines whether the step count value in the first preset duration before the connection between the anti-theft device and the peer device is disconnected is greater than the preset value, count in real time a quantity of steps that is in the first preset duration prior to each moment, so as to obtain the step count value that is in the first preset duration before the connection is disconnected.

It should be noted that, the foregoing first preset duration, the second preset duration, and the preset value all are set by a user of the anti-theft device, which is not limited herein.

According to the anti-theft device provided in this embodiment of the present disclosure, when a connection of an anti-theft device is disconnected, the anti-theft device immediately determines a step count value that is in first preset duration prior to a moment at which the connection is disconnected. If it is determined that the step count value is greater than a preset value, it is determined whether a signal strength value of a communication signal between the anti-theft device and the peer device shows a progressively decreasing trend in the first preset duration before the connection is disconnected. An alarm is immediately given if the signal strength value of the communication signal between the anti-theft device and the peer device shows a progressively decreasing trend in the first preset duration before the connection is disconnected. An alarm is immediately given if it is determined that the step count value is greater than the preset value, the signal strength value does not show a progressively decreasing trend in the first preset duration before the connection is disconnected, and the connection is not restored after being disconnected for second preset duration. In the prior art, the anti-theft device immediately gives an alarm after a signal connection is disconnected. Actually, there may be a case in which the signal connection is disconnected even when a distance between the peer device and the anti-theft device does not exceed a preset distance (for example, an obstruction between the anti-theft device and the peer device causes deterioration of a channel environment). Therefore, the anti-theft device gives erroneous vibration notification. The anti-lost notification method provided in this embodiment of the present disclosure can improve accuracy of BLUETOOTH anti-lost notification, and avoid erroneous vibration notification in a non-lost case.

Embodiment 5

Figure 5:
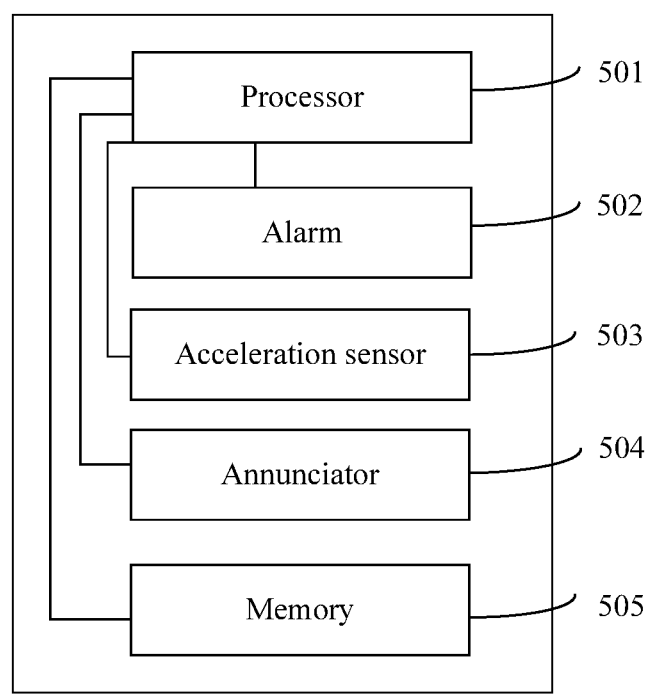
FIG. 5 is a structural block diagram of an anti-theft device according to Embodiment 5 of the present disclosure.

This embodiment of the present disclosure provides an anti-theft device. As shown in FIG. 5, the anti-theft device includes a processor 501, and an alarm 502, an acceleration sensor 503, an annunciator 504, and a memory 505 that are connected to the processor. The memory 505 stores a group of code, and the processor 501 is configured to invoke the code in the memory 505 to implement the following operations.

The processor 501 is configured to determine whether a step count value in first preset duration before a connection between the anti-theft device and a peer device is disconnected is greater than a preset value, where the first preset duration is a time interval prior to a moment at which the connection is disconnected.

The processor 501 is further configured to, if the step count value is greater than the preset value, determine whether a signal quality value sequence of a communication signal between the anti-theft device and the peer device shows a progressively decreasing trend in the first preset duration before the connection is disconnected.

The processor 501 is further configured to trigger the alarm 502 when the step count value is greater than the preset value, and the signal quality value sequence of the communication signal between the anti-theft device and the peer device is in the first preset duration before the connection is disconnected.

The processor 501 is further configured to trigger the alarm 502 if the step count value is greater than the preset value, the signal quality value sequence of the communication signal between the anti-theft device and the peer device does not show a progressively decreasing trend in the first preset duration before the connection is disconnected, and the connection is not restored after being disconnected for second preset duration.

The processor 501 is further configured to trigger the alarm 502 if the step count value is not greater than the preset value, and the connection is not restored after being disconnected for the second preset duration.

The annunciator 504 is connected to the processor 501, and is configured to send and receive a signal, and perform a signal connection with the peer device. For example, the annunciator 504 may be a BLUETOOTH module that can send and receive a BLUETOOTH signal, and perform a BLUETOOTH connection with the peer device.

In addition, the annunciator 504 further stores an RSSI value of a signal. The processor 501 determines a variation trend of an RSSI value sequence stored in the annunciator 504.

The alarm 502 is connected to the processor 501, and is configured to give an alarm according to triggering of the processor 501. The alarm 502 may be a buzzer, an LED light, or the like, and sounds a buzz, blink the LED light, or the like according to triggering of the processor 501.

The processor 501 is further configured to skip starting triggering of the alarm 502 when determining that the step count value is less than the preset value, and that the connection is restored after being disconnected for the second preset duration.

The processor 501 is further configured to skip triggering the alarm 502 when the step count value is less than the preset value, and the signal connection is restored after the second preset duration.

The acceleration sensor 503 is connected to the processor 501, and is configured to sense a user motion, and report sensed data to the processor 501.

The processor 501 is further configured to, before determining whether the step count value in the first preset duration before the connection between the anti-theft device and the peer device is disconnected is greater than the preset value, count, in real time according to the data reported by the acceleration sensor 503, a quantity of steps that is in the first preset duration prior to each moment, so as to obtain the step count value that is in the first preset duration before the connection is disconnected.

The annunciator 504 is configured to perform a signal connection with the peer device, for example, perform a BLUETOOTH connection with the peer device.

It should be noted that, the foregoing first preset duration, the second preset duration, and the preset value all are set by a user of the anti-theft device, which is not limited herein.

According to the anti-theft device provided in this embodiment of the present disclosure, when a connection of an anti-theft device is disconnected, the anti-theft device immediately determines a step count value that is in first preset duration prior to a moment at which the connection is disconnected. If it is determined that the step count value is greater than a preset value, it is determined whether a signal strength value of a communication signal between the anti-theft device and the peer device shows a progressively decreasing trend in the first preset duration before the connection is disconnected. An alarm is immediately given if the signal strength value of the communication signal between the anti-theft device and the peer device shows a progressively decreasing trend in the first preset duration before the connection is disconnected. An alarm is immediately given if it is determined that the step count value is greater than the preset value, the signal strength value does not show a progressively decreasing trend in the first preset duration before the connection is disconnected, and the connection is not restored after being disconnected for second preset duration. In the prior art, the anti-theft device immediately gives an alarm after a signal connection is disconnected. Actually, there may be a case in which the signal connection is disconnected even when a distance between the peer device and the anti-theft device does not exceed a preset distance (for example, an obstruction between the anti-theft device and the peer device causes deterioration of a channel environment). Therefore, the anti-theft device gives erroneous vibration notification. The anti-lost notification method provided in this embodiment of the present disclosure can improve accuracy of BLUETOOTH anti-lost notification, and avoid erroneous vibration notification in a non-lost case.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

The invention claimed is:

1. An anti-lost notification method, applied to an anti-theft device, wherein the method comprises:
   determining whether a step count value in a first preset duration before a connection between the anti-theft device and a peer device is disconnected is greater than a preset value;
   determining whether a signal quality value sequence of a communication signal between the anti-theft device and the peer device shows a progressively decreasing trend in the first preset duration before the connection is disconnected when the step count value is greater than the preset value; and
   giving an alarm when the signal quality value sequence shows a progressively decreasing trend in the first preset duration before the connection is disconnected.

2. The method according to claim 1, wherein the method further comprises giving an alarm when the signal quality value sequence does not show a progressively decreasing trend in the first preset duration before the connection is disconnected, and the connection is not restored after being disconnected for a second preset duration.

3. The method according to claim 1, wherein the method further comprises skipping starting an alarm when the signal quality value sequence does not show a progressively decreasing trend in the first preset duration before the connection is disconnected, and the connection is restored after being disconnected for a second preset duration.

4. The method according to claim 1, wherein the method further comprises giving an alarm when the step count value is less than the preset value, and the connection is not restored after being disconnected for a second preset duration.

5. The method according to claim 1, wherein the method further comprises skipping starting an alarm when the step count value is less than the preset value, and the connection is restored after being disconnected for a second preset duration.

6. The method according to claim 1, wherein before determining whether the step count value in first preset duration before the connection between the anti-theft device and the peer device is disconnected is greater than the preset value, the method further comprises counting, by the anti-theft device in real time, a quantity of steps that is in the first preset duration prior to each moment to obtain the step count value that is in the first preset duration before the connection is disconnected.

7. An anti-theft device, comprising:
   an alarm; and
   a processor coupled to the alarm, wherein the processor is configured to:
      determine whether a step count value in a first preset duration before a connection between the anti-theft device and a peer device is disconnected is greater than a preset value;
      determine whether a signal quality value sequence of a communication signal between the anti-theft device and the peer device shows a progressively decreasing trend in the first preset duration before the connection is disconnected when the step count value is greater than the preset value; and
      trigger the alarm to give an alarm when the signal quality value sequence shows a progressively decreasing trend in the first preset duration before the connection is disconnected.

8. The anti-theft device according to claim 7, wherein the processor is further configured to trigger the alarm to give an alarm when the signal quality value sequence does not show a progressively decreasing trend in the first preset duration before the connection is disconnected, and the connection is not restored after being disconnected for a second preset duration.

9. The anti-theft device according to claim 7, wherein the processor is further configured to trigger the alarm to give an alarm when the step count value is less than the preset value, and the connection is not restored after being disconnected for a second preset duration.

10. The anti-theft device according to claim 7, wherein the processor is further configured to skip starting an alarm when the step count value is less than the preset value, and the signal connection is restored after a second preset duration.

11. The anti-theft device according to claim 7, further comprising an acceleration sensor, wherein the acceleration sensor is configured to:
    connect to the processor; and
    sense a user motion to report sensed data to the processor, wherein before determining, according to the data reported by the acceleration sensor, whether the step count value in the first preset duration before the connection between the anti-theft device and the peer device is disconnected is greater than the preset value, the processor counts in real time a quantity of steps that is in the first preset duration prior to each moment.

* * * * *